United States Patent
Tessler et al.

(10) Patent No.: US 12,413,614 B2
(45) Date of Patent: Sep. 9, 2025

(54) COMPUTER-BASED SYSTEMS CONFIGURED TO DYNAMICALLY ENHANCE A SPAM PREVENTION FUNCTIONALITY ON A COMPUTING DEVICE AND METHODS OF USE THEREOF

(71) Applicant: Capital One Services, LLC, McLean, VA (US)

(72) Inventors: Leeyat Bracha Tessler, Arlington, VA (US); Dwij Trivedi, Oakton, VA (US); Abhay Donthi, Cary, NC (US); Salik Shah, Washington, DC (US); Jennifer Kwok, New York, NY (US)

(73) Assignee: Capital One Services, LLC, McLean, VA (US)

( * ) Notice: Subject to any disclaimer, the term of this patent is extended or adjusted under 35 U.S.C. 154(b) by 146 days.

(21) Appl. No.: 18/500,732

(22) Filed: Nov. 2, 2023

(65) Prior Publication Data
US 2025/0150479 A1    May 8, 2025

(51) Int. Cl.
*H04L 9/40* (2022.01)

(52) U.S. Cl.
CPC ...... *H04L 63/1433* (2013.01); *H04L 63/1416* (2013.01); *H04L 63/1425* (2013.01)

(58) Field of Classification Search
CPC ............. H04L 63/1425; H04L 63/1433; H04L 63/1416
USPC ............................................. 726/23; 713/189
See application file for complete search history.

(56) References Cited

U.S. PATENT DOCUMENTS

| | | | | |
|---|---|---|---|---|
| 8,132,235 | B2* | 3/2012 | Bussani | H04L 63/0884 |
| | | | | 713/168 |
| 10,785,258 | B2* | 9/2020 | Lam | H04L 63/1416 |
| 11,107,141 | B1* | 8/2021 | Nagarajappa | G06Q 30/0617 |
| 11,489,739 | B2* | 11/2022 | Higgins | H04L 41/5051 |
| 11,537,744 | B2* | 12/2022 | Dotan-Cohen | H04L 63/102 |
| 12,101,281 | B2* | 9/2024 | Durairaj | H04L 51/04 |
| 2023/0171268 | A1* | 6/2023 | Marwah | H04L 63/1433 |
| | | | | 726/22 |

* cited by examiner

Primary Examiner — Amare F Tabor
(74) Attorney, Agent, or Firm — Greenberg Traurig, LLP

(57) ABSTRACT

In some embodiments, the present disclosure provides an exemplary method that may include steps of receiving a notification to engage a transmission guard bot in a communication session; generating a trained transmission guard bot configured with communication capabilities to engage the communication session; engaging the trained transmission guard bot into the communication session between the plurality of computing devices associated with the plurality of users; utilizing the trained transmission guard bot to continually monitor a plurality of content data associated with the communication session for a predetermined period of time; detecting a suspicious content data point within the plurality of content data associated with the communication session based on the continual monitoring of the at least one transmission guard bot; determining a risk assessment metric associated with the communication session; and invoking an action related to spam prevention via the at least one trained transmission guard bot.

20 Claims, 8 Drawing Sheets

COMPUTER-BASED SYSTEMS CONFIGURED TO DYNAMICALLY ENHANCE A SPAM PREVENTION FUNCTIONALITY ON A COMPUTING DEVICE AND METHODS OF USE THEREOF

FIELD OF TECHNOLOGY

The present disclosure generally relates to computer-based systems configured to dynamically enhance an optimized spam prevention functionality and methods of use thereof.

BACKGROUND OF TECHNOLOGY

Typically, spam is directed to large numbers of users for the purposes of advertising, phishing, or spreading malware. Usually, spam includes all forms of unwanted communications including, but not limited to unsolicited calls or messages, caller identification spoofing, and/or robocalls. The goal or purpose of a spam call is to sell some goods that might be unsolicited or unwanted.

SUMMARY OF DESCRIBED SUBJECT MATTER

In some embodiments, the present disclosure provides an exemplary technically improved computer-based method that includes at least the following steps: receiving, by one or more processors, a notification to engage at least one transmission guard bot of a plurality of transmission guard bots in a communication session between a plurality of computing devices associated with a plurality of users; generating, by the one or more processors and in response to the received notification, at least one trained transmission guard bot configured with a plurality of communication capabilities to engage the communication session between the plurality of computing devices associated with the plurality of users; engaging, by the one or more processors, the at least one trained transmission guard bot into the communication session between the plurality of computing devices associated with the plurality of users, where the at least one trained transmission guard bot is configured with an ability to perform at least one voice function during the communication session based on the plurality of communication capabilities; utilizing, by the one or more processors, the at least one trained transmission guard bot to continually monitor a plurality of content data associated with the communication session for a predetermined period of time; detecting, by the one or more processors, at least one suspicious content within the plurality of content data associated with the communication session based on the monitoring of the at least one transmission guard bot; determining, by the one or more processors and in response to detecting the at least one suspicious content, a risk assessment metric associated with the communication session based on the at least one suspicious content and the plurality of content data associated with the communication session; invoking, by the one or more processors, at least one action related to spam prevention via the at least one trained transmission guard bot by: accessing a bot system that comprises a plurality of specialty bots, each specialty bot provisioned to perform at least one action; selecting at least one specialty bot from the plurality of specialty bots based at least in part on the risk assessment metric; and invoking the at least one specialty bot to perform the at least one action, wherein the at least one action comprises at least one of: causing the communication session to terminate, causing another bot to join the communication session, tracing a phone number from which the second user initiates the communication session, transmitting a new communication to the computing device of the at least one user, causing a computing device associated with an entity impersonated in the communication session to commence a cross reference for the communication session against a call log associated with the entity, reporting information pertaining to the communication session to the entity, communicating contact information of the entity to the at least one user at the computing device, or selecting and invoking an additional specialty bot to perform an action related to spam prevention; and dynamically enhancing, by the one or more processors, at least one computing device of the plurality of devices with an optimized spam prevention functionality by utilizing the at least one specialty bot to operate remotely on the at least one computing device.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
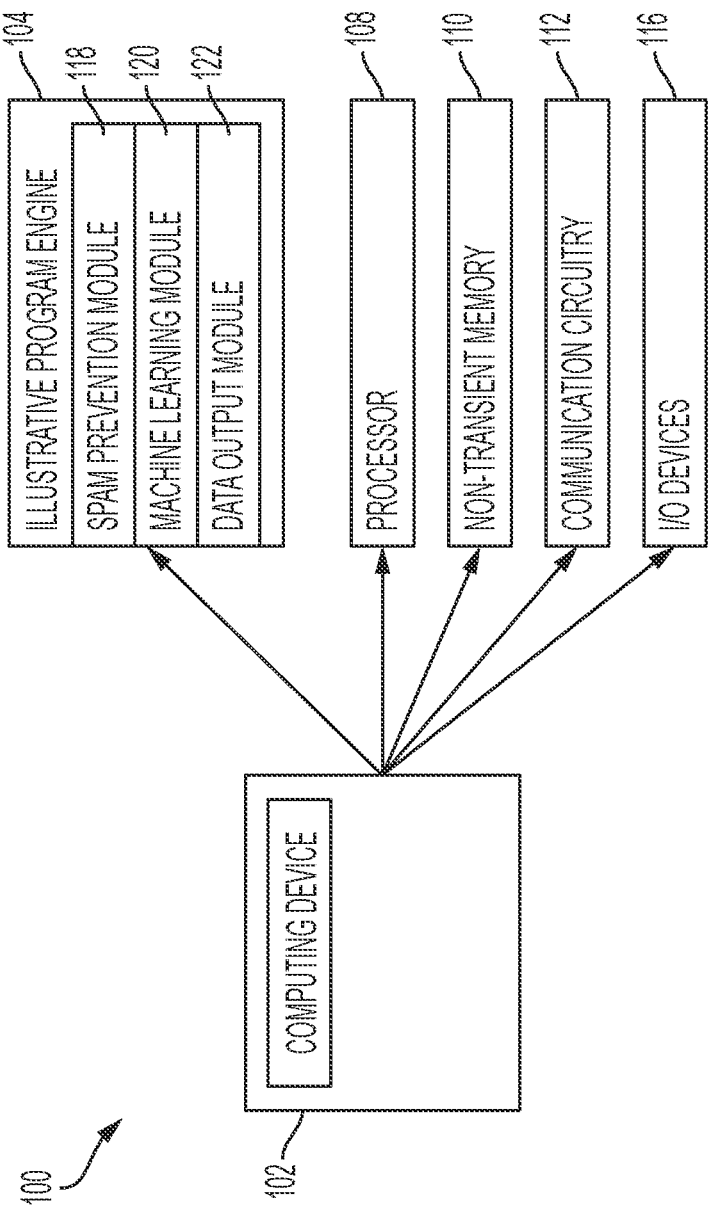
FIG. 1 depicts a block diagram of an exemplary computer-based system and platform for dynamically enhancing at least one computing device with an optimized spam prevention functionality, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

At least some embodiments of the present disclosure are directed to solve at least one technological computer-centered problem associated with receiving an excess number of suspicious interactions over a period of time with a computing device associated with a particular individual. An illustrative technological computer-centered problem associated with the receiving a plurality of suspicious interactions typically arises when there may be a lack of an optimized spam prevention technology within the computing device (e.g., a smartphone, a tablet having phone-like capability, a laptop having a phone-like capability, etc.) associated with the particular individual capable of detecting these suspicious interactions and automatically filtering these suspicious interactions. The illustrative technological computer-centered problem may increase potential security risks associated with the use of the computing device by the particular user due to a purpose of at least one suspicious interaction to extract sensitive information associated with the identity of the particular user, such as retrieving account information and/or phishing funds from the particular user. As detailed in at least some embodiments herein, at least one technological computer-centered solution addressing the illustrative technological computer-centered problem may be to utilize an optimized spam prevention functionality within the computing device associated with the particular user to determine a risk assessment metric associated with the suspicious interaction session. In some embodiments, the present disclosure details that one practical solution may be to engage in communication with a suspicious actor of the suspicious interaction session by generating a trained transmission guard bot that may be configured with a plurality of communication capabilities. In some embodiments, the present disclosure details that one practical solution may be to continually monitor a plurality of content data points/items associated with the suspicious interaction session by utilizing the at least one trained transmission guard bot. In some embodiments, the present disclosure details that one practical solution may also be to detect at least one suspicious content within the plurality of content data. In some embodiments, the present disclosure details that one practical solution may also be to determine a risk assessment metric associated with a communication session based on suspicious content and the plurality of content data. In certain embodiments, the trained transmission guard bot may refer to a plurality of computer programs that are configured and/or programmed to perform automatic iterative tasks operating on a service platform at a scale to automate core components of their own service offering. In some embodiments, the present disclosure details that one practical solution may also be to invoke at least one action of a plurality of actions related to spam prevention via the at least one trained transmission guard bot. For example, the present disclosure details that one practical solution may also be to invoke at least one action related to spam prevention by accessing a bot system that includes a plurality of specialized bots; selecting at least one specialized bot from the plurality of specialized bots based on the determined risk assessment metric; and transmit instruction of operation to the selected specialized bot to perform at least one spam prevention function within the computing device.

FIG. 1 depicts a block diagram of an exemplary computer-based system and platform for dynamically enhancing at least one computing device with an optimized spam prevention functionality, in accordance with one or more embodiments of the present disclosure.

In some embodiments, an illustrative computing system 100 of the present disclosure may include a computing device 102 associated with at least one user and an illustrative program engine 104. In some embodiments, the illustrative program engine 104 may be stored on the computing device 102. In some embodiments, the illustrative program engine 104 may be stored on the computing device 102, which may include a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, the computing device 102 may refer to at least one calling-enabled computing device of a plurality of calling-enabled computing devices. For example, the computing device 102 may refer to a smart phone. In certain embodiments, the computing device 102 may communicate with external computing devices and/or a server computing device 106 (not shown) via a cloud network 109 (not shown).

In some embodiments, the illustrative program engine 104 may be configured to instruct the processor 108 to execute one or more software modules such as, without limitation, an exemplary spam prevention module 118, a machine-learning module 120, and/or a data output module 122.

In some embodiments, an exemplary spam prevention module 118 of the present disclosure, may utilize at least one trained machine learning algorithm, described herein, to dynamically enhance the computing device 102 with an optimized spam prevention functionality via at least one specialized bot that may be capable of remote operation of the computing device 102. In some embodiments, the exemplary spam prevention module 118 may invoke at least one action related to spam prevention via at least one trained transmission guard bots by accessing a bot system that include a plurality of specialty bots; selecting at least one specialty bot of the plurality of specialty bots based in part on a risk assessment metric; and transmitting instructions to the at least one specialty bot to perform at least one spam prevention function within the computing device 102. In certain embodiments, the at least one action may refer to a plurality of spam prevention actions performed by the computing device 102. For example, the plurality of spam prevention actions may refer to causing the communication session to terminate, causing another bot to join the communication session, tracing a phone number from which the second user initiates the communication session, transmitting a new communication to the computing device of the at least one user, causing a computing device associated with an entity impersonated in the communication session to commence a cross reference for the communication session against a call log associated with the entity, reporting information pertaining to the communication session to the entity, communicating contact information of the entity to the at least one user at the computing device, and/or selecting and invoking an additional specialty bot of the plurality of specialty bots to perform an action related to spam prevention. In certain embodiments, the at least one trained transmission guard bot may refer to a software application programmed to automate a plurality of tasks related to continually monitor content data associated with a communication session and detect at least one suspicious content data point within the content data. For example, the at least one trained transmission guard bot may be configured with an ability to perform at least one voice function during the duration of the communication session. In certain embodiments, the trained transmission guard bot may refer to a multi-tiered bot system capable of simultaneously communication to a plurality of computing devices. In certain embodiments, the risk assessment metric may refer to a calculated risk score assigned to each suspicious content data point based on a plurality of risk factors compared to a predetermined risk threshold. In some embodiments, the exemplary spam prevention module 118 may receive a notification to engage the at least one transmission guard bot during the duration of the communication session between the computing device 102 and an external computing device. In certain embodiments, the communication session may refer to the computing device 102 initiating a particular communication session with the server computing device 106. In some embodiments, the exemplary spam prevention module 118 may train the at least one trained transmission guard bot by utilizing a plurality of voice characterizes associated with at least one user of a plurality of users over a predetermined period of time and remotely operating the computing device 102 of the plurality of computing devices for the predetermined period of time during the communication session. In some embodiments, the exemplary spam prevention module 118 may receive permission from the at least one user prior to the communication session to continually monitor the plurality of content data associated with the communication session.

In some embodiments, the present disclosure describes systems for automatically utilizing the at least one trained machine learning algorithm of a plurality of trained machine learning algorithms within the machine learning module 120 that may determine a risk assessment metric associated with the communication session in response to detecting at least one suspicious content data point in the content data. In some embodiments, the machine learning module 120 may determine the risk assessment metric by dynamically calculating a risk metric value associated for each content data of the plurality of content data based on a range of one to five. In certain embodiments, the machine learning module 120 may dynamically calculate the risk metric value associated with the plurality of content data by adding each content data point of the plurality of content data. For example, without limitation, the machine learning module 120 may assess a suspicious content data point as a high risk and a content data point assessed with a low risk may be assigned a value of one and a content data point assessed with a high risk may be assigned a value of five. In some embodiments, the machine learning module 120 may enhance the computing device 102 with an optimized spam prevention functionality based on a utilization of at least one specialty bots capable of remote operation of the computing device 102. In some embodiments, the machine learning module 120 may continually monitor the plurality of content data associated with the communication session for a predetermined period of time by utilizing the at least one trained transmission guard bot. In some embodiments, the machine learning module 120 may detect at least one suspicious content data point within the plurality of content data associated with the communication session based on the monitoring of the at least one transmission guard bot. In certain embodiments, the machine learning module 120 may refer to the trained machine learning algorithm trained using an unsupervised learning and/or a semi-supervised learning for the predetermined period of time. For example, the machine learning module may include at least one of regression algorithm, instance-based algorithm, regularization algorithm, decision tree algorithm, Bayesian algorithm, clustering algorithm, associated rule learning algorithm, deep learning algorithm, dimensionality reduction algorithm, ensemble algorithm, and/or artificial neural network algorithm.

In some embodiments, the data output module 122 may generate a notification to engage the at least one transmission guard bot of a plurality of transmission guard bots during the duration of the communication session between the computing device 102 and another computing device. In some embodiments, the data output module 122 may generate the at least one transmission guard bot of the plurality of transmission guard bots during the duration of the communication session. In some embodiments, the data output module 122 may detect at least one suspicious content data point within the plurality of content data associated with the communication session based on continual monitoring of the computing device 102. In some embodiments, the data output module 122 may generate the risk assessment metric associated with the communication session based on the at least one suspicious content data point and the plurality of content data associated with the computing device 102. In some embodiments, the data output module 122 may train the at least one transmission guard bot by utilizing a plurality of voice characteristics associated with at least one user of a plurality of users associated with the computing device 102 over a predetermined period of time and remotely operating the computing device 102 for the predetermined period of time during the duration of the communication session. In some embodiments, the data output module 122 may mute at least one user associated with the computing device 102 when speaking within the communication session. In some embodiments, the data output module 122 may receive permission from the at least one user associated with the computing device 102 prior to the communication session to continually monitor for the plurality of content data associated with the communication session. In some embodiments, the data output module 122 may determine the risk assessment metric by dynamically calculating a risk metric value associated with each content data point of the plurality of content data based on a plurality of risk factors. In some embodiments, the data output module 122 may enhance the computing device 102 with an optimized spam prevention functionality by remoting operating the computing device 102 with the at least one specialty bot.

In some embodiments, the illustrative program engine 104 may receive a notification to engage at least one transmission guard bot of a plurality of transmission guard bots in a communication session between the computing device 102 and the external computing device. In some embodiments, the illustrative program engine 104 may generate at least one trained transmission guard bot configured with a plurality of communication capabilities to engage the communication session between the plurality of computing devices associated with the plurality of users in response to the received notification. In some embodiments, the illustrative program engine 104 may engage the at least one trained transmission guard bot into the communication session between the plurality of computing devices, where the at least one trained transmission guard bot may be configured with an ability to perform at least one voice function during the communication session based on the plurality of communication capabilities. In some embodiments, the illustrative program engine 104 may utilize the at least one trained transmission guard bot to continually monitor a plurality of content data associated with the communication session for a predetermined period of time. In some embodiments, the illustrative program engine 104 may detect at least one suspicious content data point within the plurality of content data associated with the communication session based on the monitoring of the at least one trained transmission guard bot. In some embodiments, the illustrative program engine 104 may determine a risk assessment metric associated with the communication session based on the at least one suspicious content data point and the plurality of content data associated with the communication session. In some embodiments, the illustrative program engine 104 may invoke at least one action related to spam prevention via the at least one trained transmission guard bot by accessing a bot system that comprises a plurality of specialty bots, each specialty bot provisioned to perform at least one action; selecting at least one specialty bot from the plurality of specialty bots based at least in part on the risk assessment metric; and invoking the at least one specialty bot to perform the at least one action, wherein the at least one action comprises at least one of: causing the communication session to terminate, causing another bot to join the communication session, tracing a phone number from which the second user initiates the communication session, transmitting a new communication to the computing device of the at least one user, causing a computing device associated with an entity impersonated in the communication session to commence a cross reference for the communication session against a call log associated with the entity, reporting information pertaining to the communication session to the entity, communicating contact information of the entity to the at least one user at the computing device, and/or selecting and invoking an additional specialty bot to perform an action related to spam prevention In some embodiments, the non-transient memory 110 may store the notification to engage the at least one transmission guard bot in the communication session between the computing device 102 and an external computing device associated with the user. In some embodiments, the non-transient memory 110 may store the at least one trained transmission guard bot configured with a plurality of communication capabilities to engage the communication session. In some embodiments, the non-transient memory 110 may store a result associated with the continually monitoring of the plurality of content data associated with the computing device 102. In some embodiments, the non-transient memory 110 may store the at least one suspicious content data point within the plurality of content data associated the communication session. In some embodiments, the non-transient memory 110 may store the risk assessment metric associated with the communication session based on the at least one suspicious content data point and the plurality of content data. In some embodiments, the non-transient memory 110 may store a plurality of actions related to spam prevention. In certain embodiments, the plurality of actions related to spam prevention may refer to at least one action that dynamically enhances the computing device 102 with an optimized spam prevention functionality. For example, the non-transient memory 110 may include causing the communication session to terminate, causing another bot to join the communication session, tracing a phone number from which the second user initiates the communication session, transmitting a new communication to the computing device of the at least one user, causing a computing device associated with an entity impersonated in the communication session to commence a cross reference for the communication session against a call log associated with the entity, reporting information pertaining to the communication session to the entity, communicating contact information of the entity to the at least one user at the computing device, and/or selecting and invoking an additional specialty bot to perform an action related to spam prevention.

Figure 2:
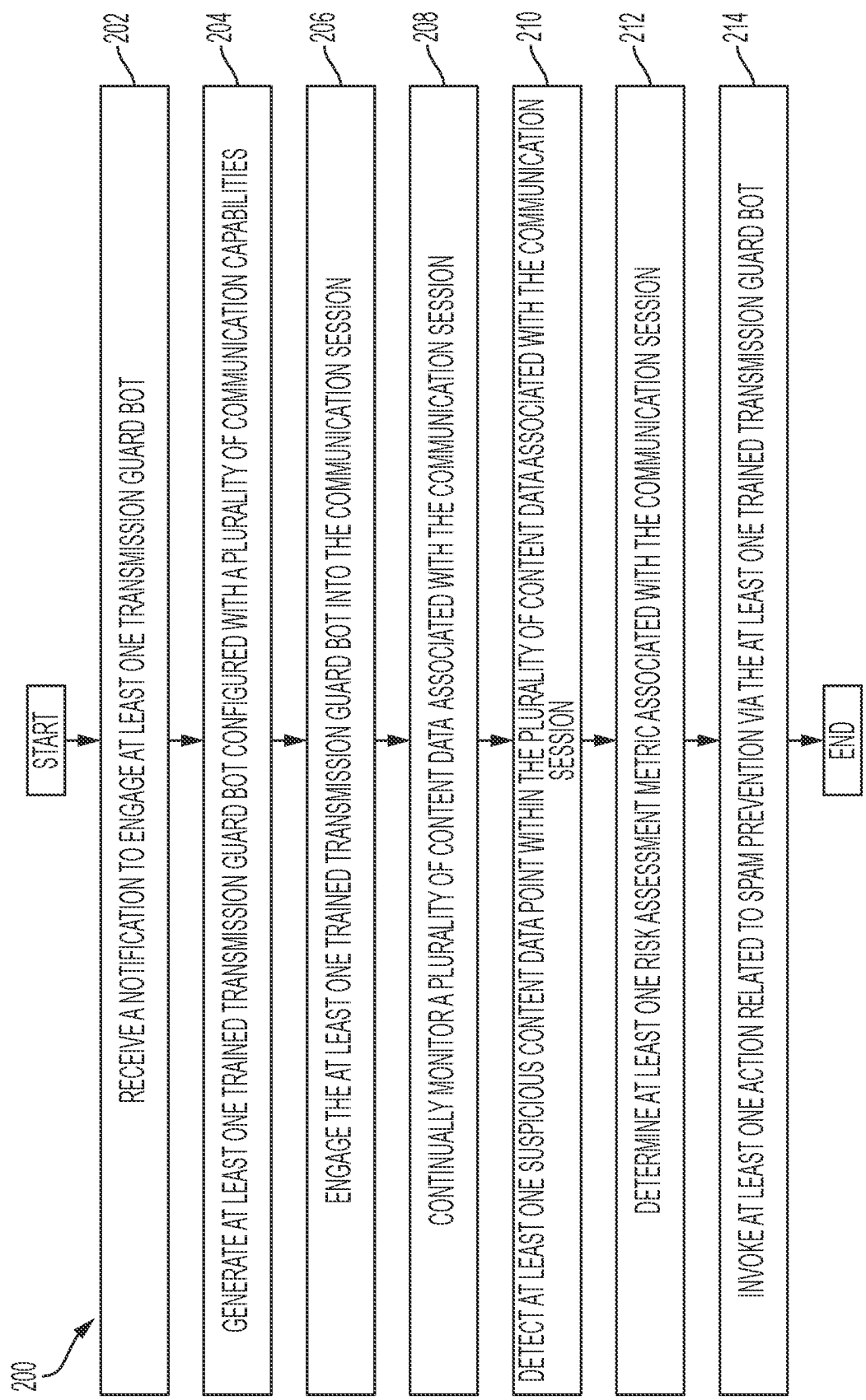
FIG. 2 is a flowchart illustrating operational steps of dynamically enhancing at least one computing device with an optimized spam prevention functionality, in accordance with one or more embodiments of the present disclosure.

FIG. 2 is a flowchart 200 illustrating operational steps for dynamically enhancing at least one computing device with an optimized spam prevention functionality, in accordance with one or more embodiments of the present disclosure.

In step 202, the illustrative program engine 104 within the computing device 102 may be programmed to receive a notification to engage at least one transmission guard bot. In some embodiments, the illustrative program engine 104 receive the notification to engage the at least one transmission guard bot of a plurality of transmission guard bots in a communication session between the computing device 102 and at least one external computing device. In some embodiments, the computing device 102 may refer to a smart phone, a laptop, and/or any computing device capable of making phone calls and receiving phone calls. In certain embodiments, the notification to engage may refer to transmitting instructions to the at least one transmission guard bot to activate within the computing device 102. In some embodiments, the exemplary spam prevention module 118 receive the notification to engage the at least one transmission guard bot of a plurality of transmission guard bots in a communication session between the computing device 102 and at least one external computing device.

In step 204, the illustrative program engine 104 may generate at least one trained transmission guard bot configured with a plurality of communication capabilities. In some embodiments, the illustrative program engine 104 may generate the at least one trained transmission guard bot configured with the plurality of communication capabilities to engage the communication session between the computing device 102 and the at least one external computing device. In some embodiments, the illustrative program engine 104 may train the at least one trained transmission guard bot by utilizing a plurality of voice characterizes associated with at least one user of a plurality of users over a predetermined period of time and remotely operating the computing device 102 of the plurality of computing devices for the predetermined period of time during the communication session. In certain embodiments, the at least one trained transmission guard bot may refer to a software application programmed to automate a plurality of tasks related to continually monitor content data associated with a communication session and detect at least one suspicious content data point within the content data. For example, the at least one trained transmission guard bot may be configured with an ability to perform at least one voice function during the duration of the communication session. In certain embodiments, the trained transmission guard bot may refer to a multi-tiered bot system capable of simultaneously communication to a plurality of computing devices. In some embodiments, the exemplary spam prevention module 118 may generate the at least one trained transmission guard bot configured with the plurality of communication capabilities to engage the communication session between the computing device 102 and the at least one external computing device.

In step 206, the illustrative program engine 104 may engage the at least one trained transmission guard bot into the communication session. In some embodiments, the illustrative program engine 104 may engage the at least one trained transmission guard bot into the communication session between the computing device 102 and the at least one external computing device. In some embodiments, the illustrative program engine 104 may transmit instructions to the trained transmission guard bot to perform at least one voice function during the communication session based on the plurality of communication capabilities. In some embodiments, the exemplary spam prevention module 118 may engage the at least one trained transmission guard bot into the communication session between the computing device 102 and the at least one external computing device.

In step 208, the illustrative program engine 104 may continually monitor a plurality of content data associated with the communication session. In some embodiments, the illustrative program engine 104 may continually monitor the plurality of content data associated with the communication session for a predetermined period of time. In some embodiments, the illustrative program engine 104 may utilize the at least one trained transmission guard bot to continually monitor the plurality of content data associated with the communication session for the predetermined period of time. In certain embodiments, illustrative program engine 104 may receive permission from at least one user of the plurality of users prior to the communication session to continually monitor for the plurality of content data associated with the communication session. In some embodiments, the exemplary spam prevention module 118 may utilize the at least one trained transmission guard bot to continually monitor the plurality of content data associated with the communication session for the predetermined period of time.

In step 210, the illustrative program engine 104 may detect at least one suspicious content data point within the plurality of content data associated with the communication session. In some embodiments, the illustrative program engine 104 may detect the at least one suspicious content data point within the plurality of content data associated with the communication session based on the continual monitoring of the trained transmission guard bot. In certain embodiments, illustrative program engine 104 may utilize the at least one trained transmission guard bot that may refer to a software application programmed to automate a plurality of tasks related to continually monitor content data associated with a communication session and detect at least one suspicious content data point within the content data. In some embodiments, the exemplary spam prevention module 118 may detect the at least one suspicious content data point within the plurality of content data associated with the communication session based on the continual monitoring of the trained transmission guard bot.

In step 212, the illustrative program engine 104 may determine at least one risk assessment metric associated with the communication session. In some embodiments, the illustrative program engine 104 may determine the at least one risk assessment metric associated with the communication session based on the at least one suspicious content data point and the plurality of content data associated with the communication session. In some embodiments, the illustrative program engine 104 may determine the at least one risk assessment metric associated with the communication session by dynamically calculating a risk metric value associated for each content data of the plurality of content data based on a range of one to five in response to detecting the at least one suspicious content data point. In certain embodiments, the illustrative program engine 104 may dynamically calculate the risk metric value associated with the plurality of content data by adding each content data point of the plurality of content data. For example, the machine learning module 120 may assess a suspicious content data point as a high risk and a content data point assessed with a low risk may be assigned a value of one and a content data point assessed with a high risk may be assigned a value of five. In some embodiments, the illustrative program engine 104 may utilize the machine learning module 120 to determine the at least one risk assessment metric associated with the communication session by dynamically calculating a risk metric value associated for each content data of the plurality of content data based on a range of one to five. In some embodiments, the exemplary spam prevention module 118 may utilize the machine learning module 120 to determine the at least one risk assessment metric associated with the communication session by dynamically calculating a risk metric value associated for each content data of the plurality of content data based on a range of one to five. In certain embodiments, the risk assessment metric may refer to a calculated risk score assigned to each suspicious content data point based on a plurality of risk factors compared to a predetermined risk threshold.

In step 214, the illustrative program engine 104 may invoke at least one action related to spam prevention via the at least one trained transmission guard bot. In some embodiments, the illustrative program engine 104 may invoke the at least one action related to spam prevention via the at least one trained transmission guard bot by accessing a bot system that comprises a plurality of specialty bots, each specialty bot provisioned to perform at least one action; selecting at least one specialty bot from the plurality of specialty bots based at least in part on the risk assessment metric; and invoking the at least one specialty bot to perform the at least one action. In some embodiments, the exemplary spam prevention module 118 may invoke the at least one action related to spam prevention via the at least one trained transmission guard bot by accessing a bot system that comprises a plurality of specialty bots, each specialty bot provisioned to perform at least one action; selecting at least one specialty bot from the plurality of specialty bots based at least in part on the risk assessment metric; and invoking the at least one specialty bot to perform the at least one action. In some embodiments, the illustrative program engine 104 may dynamically enhance the computing device 102 with an optimized spam prevention functionality via at least one specialized bot that may be capable of remote operation of the computing device 102. In some embodiments, the exemplary spam prevention module 118 may dynamically enhance the computing device 102 with an optimized spam prevention functionality via at least one specialized bot that may be capable of remote operation of the computing device 102.

Figure 3:
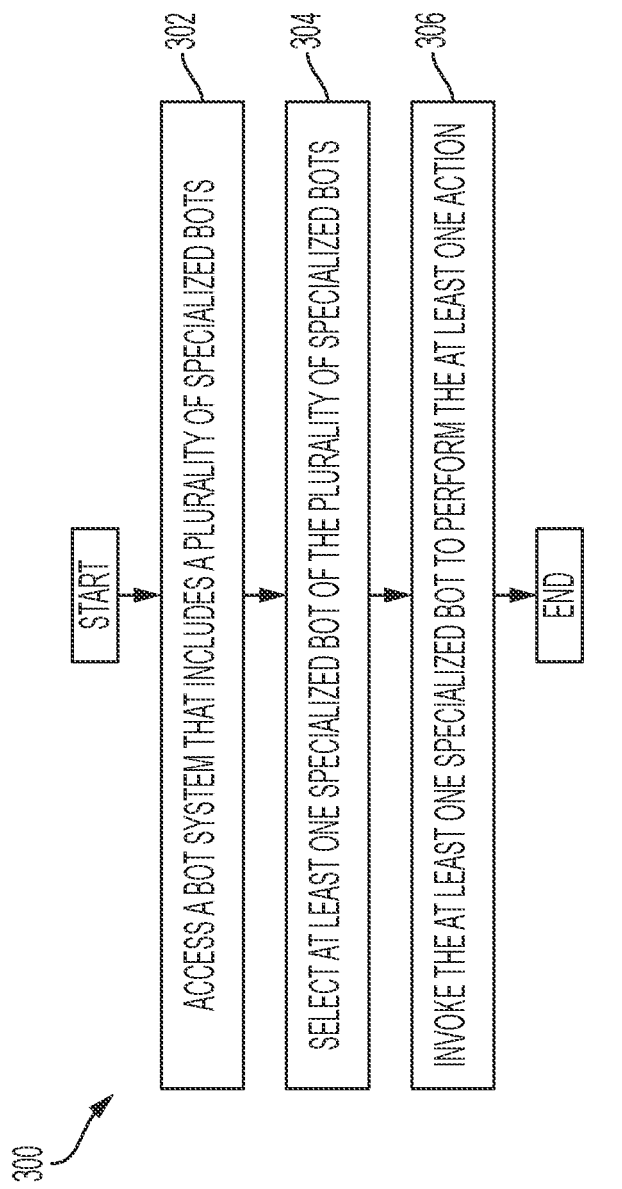
FIG. 3 is a flowchart illustrating operational steps of invoking at least one action related to spam prevention via the at least one trained transmission guard bot, in accordance with one or more embodiments of the present disclosure.

FIG. 3 is a flowchart 300 illustrating operational steps of invoking at least one action related to spam prevention via the at least one trained transmission guard bot, in accordance with one or more embodiments of the present disclosure.

In step 302, the illustrative program engine 104 may access a bot system that comprises a plurality of specialized bots. In some embodiments, the illustrative program engine 104 may access the bot system that comprises the plurality of specialized bots, where each specialized bot may be capable of performing at least one action of a plurality of actions. In certain embodiments, the at least one action may refer to an optimized spam prevention function. In some embodiments, the exemplary spam prevention module 118 may access the bot system that comprises the plurality of specialized bots, where each specialized bot may be capable of performing at least one action of a plurality of actions.

In step 304, the illustrative program engine 104 may select at least one specialized bot of the plurality of specialized bots. In some embodiments, the illustrative program engine 104 may select at least one specialized bot of the plurality of specialized bots based at least in part on the risk assessment metric. In some embodiments, the illustrative program engine 104 may utilize the machine learning module 120 to dynamically calculate the risk assessment metric by aggregating a plurality of risk assessment metric value associated for each content data of the plurality of content data based on a range of one to five in response to detecting the at least one suspicious content data point and dynamically rank each specialized bot of the plurality of specialized bots based on a rules engine matches a configuration associated with each specialized bot and its ability to perform the action associated with the risk assessment metric. In some embodiments, the exemplary spam prevention module 118 may select at least one specialized bot of the plurality of specialized bots based at least in part on the risk assessment metric.

In step 306, the illustrative program engine 104 may invoke the at least one specialized bot to perform the at least one action. In some embodiments, the illustrative program engine 104 may transmit instructions to the at least one specialized bot to remotely operate the computing device 102 and to perform the at least one action. In certain embodiments, the at least one action may refer to enhancing the computing device 102 with an optimized spam prevention functionality by utilizing the at least one specialized bot to remotely operate on the computing device 102. For example, the at least one action may refer to causing the communication session to terminate, causing another bot to join the communication session, tracing a phone number from which the second user initiates the communication session, transmitting a new communication to the computing device of the at least one user, causing a computing device associated with an entity impersonated in the communication session to commence a cross reference for the communication session against a call log associated with the entity, reporting information pertaining to the communication session to the entity, communicating contact information of the entity to the at least one user at the computing device, and/or selecting and invoking an additional specialty bot to perform an action related to spam prevention. In some embodiments, the exemplary spam prevention module 118 may transmit instructions to the at least one specialized bot to remotely operate the computing device 102 and to perform the at least one action.

Figure 4:
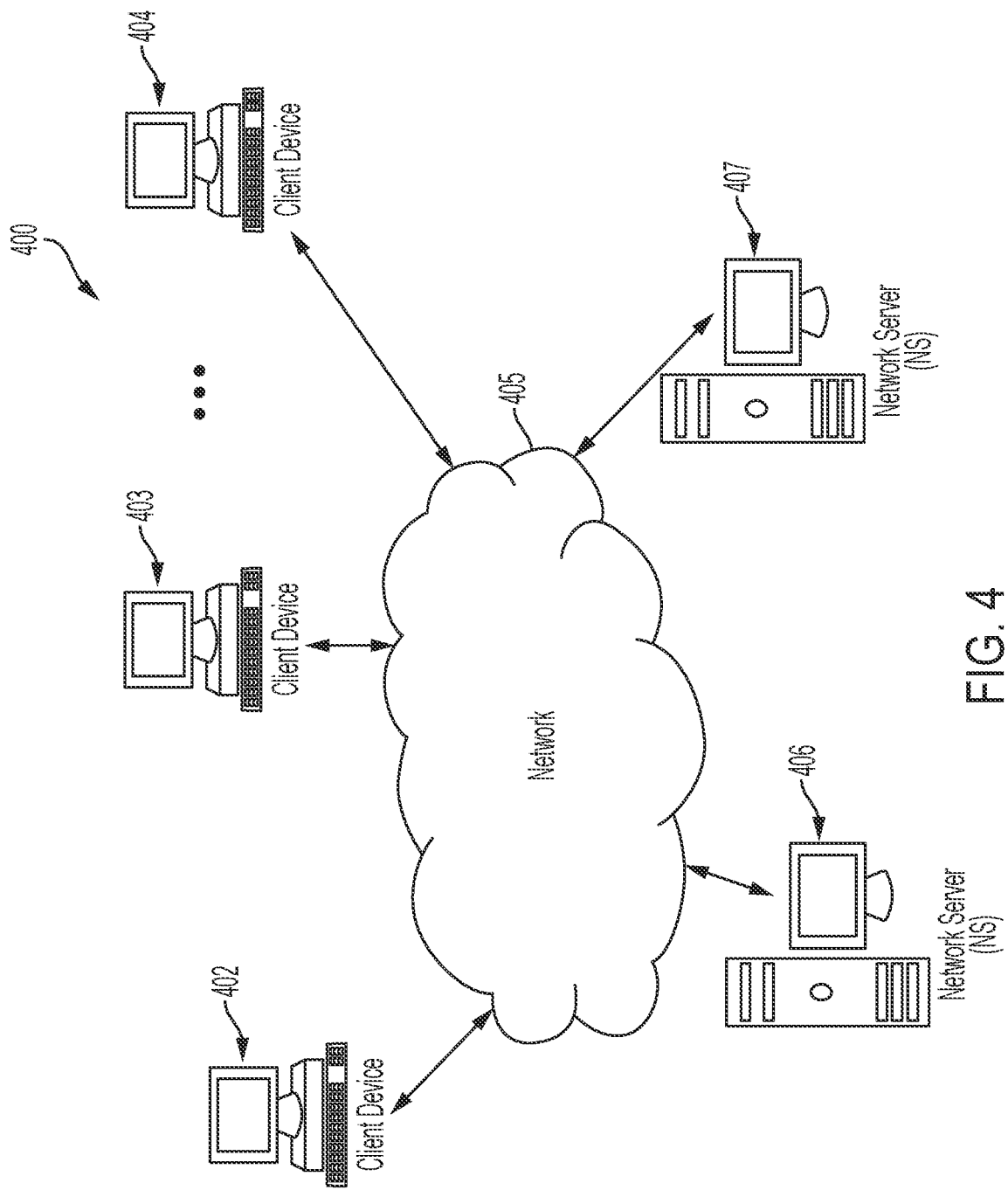
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured dynamically enhance the computing device 102 with an optimized spam prevention functionality via at least one specialized bot that may be capable of remote operation of the computing device 102, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to remotely execute the instructions associated with the exemplary spam prevention module 118 of the present disclosure, automatically utilizing at least one machine-learning model described herein.

In some embodiments, referring to FIG. 4, members 402-404 (e.g., clients) of the exemplary computer-based system/platform 400 may include virtually any computing device capable of invoke the at least one action related to spam prevention via the at least one trained transmission guard bot by accessing a bot system that comprises a plurality of specialty bots, each specialty bot provisioned to perform at least one action; selecting at least one specialty bot from the plurality of specialty bots based at least in part on the risk assessment metric; and invoking the at least one specialty bot to perform the at least one action via a network (e.g., cloud network 109), such as network 405, to and from another computing device, such as servers 406 and 407, each other, and the like. In some embodiments, the member devices 402-404 may be smart phones, personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, the exemplary spam prevention module 118 of the present disclosure may be configured to determine at least one risk assessment metric associated with the communication session, invoke at least one action related to spam prevention via the at least one trained transmission guard bot, and employ virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing services servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to invoke the at least one action related to spam prevention via the at least one trained transmission guard bot by accessing a bot system that comprises a plurality of specialty bots, each specialty bot provisioned to perform at least one action; selecting at least one specialty bot from the plurality of specialty bots based at least in part on the risk assessment metric; and invoking the at least one specialty bot to perform the at least one action.

Figure 5:
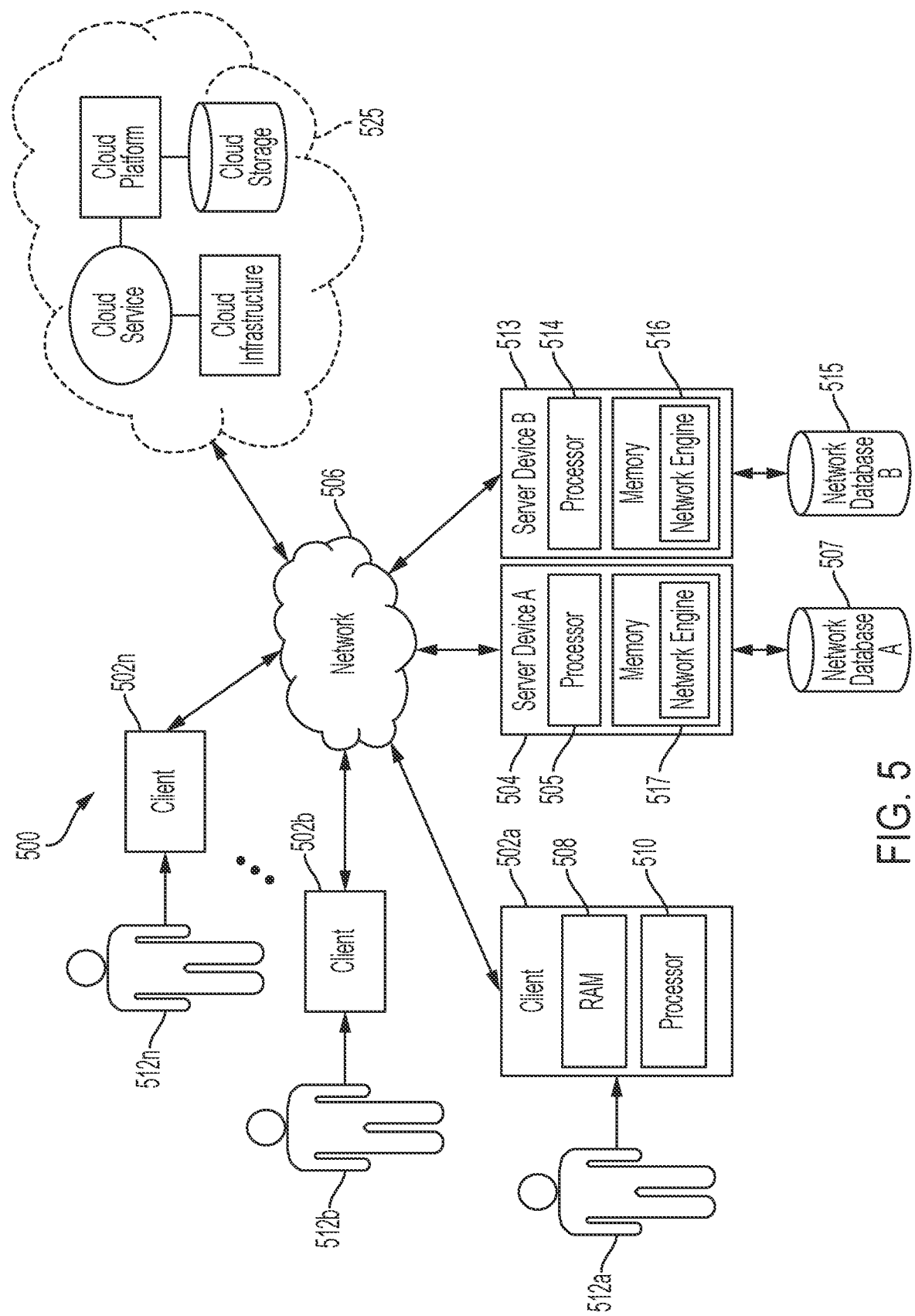
FIG. 5 depicts a block diagram of another exemplary computer-based system/platform in accordance with one or more embodiments of the present disclosure

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
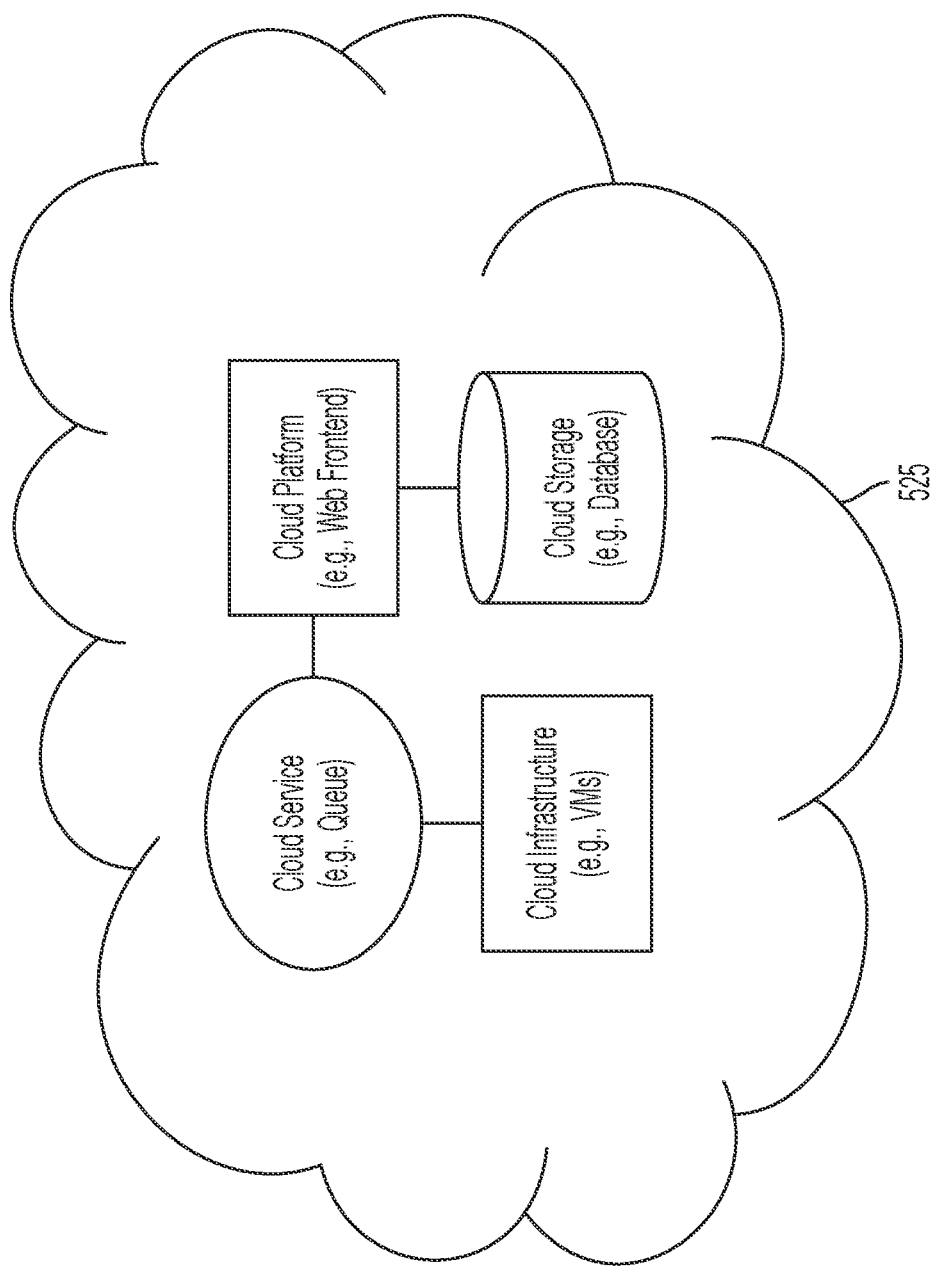
FIGS. 6 and 7 are diagrams illustrating implementations of cloud computing architecture/aspects with respect to which the disclosed technology may be specifically configured to operate, in accordance with one or more embodiments of the present disclosure.
Figure 7:
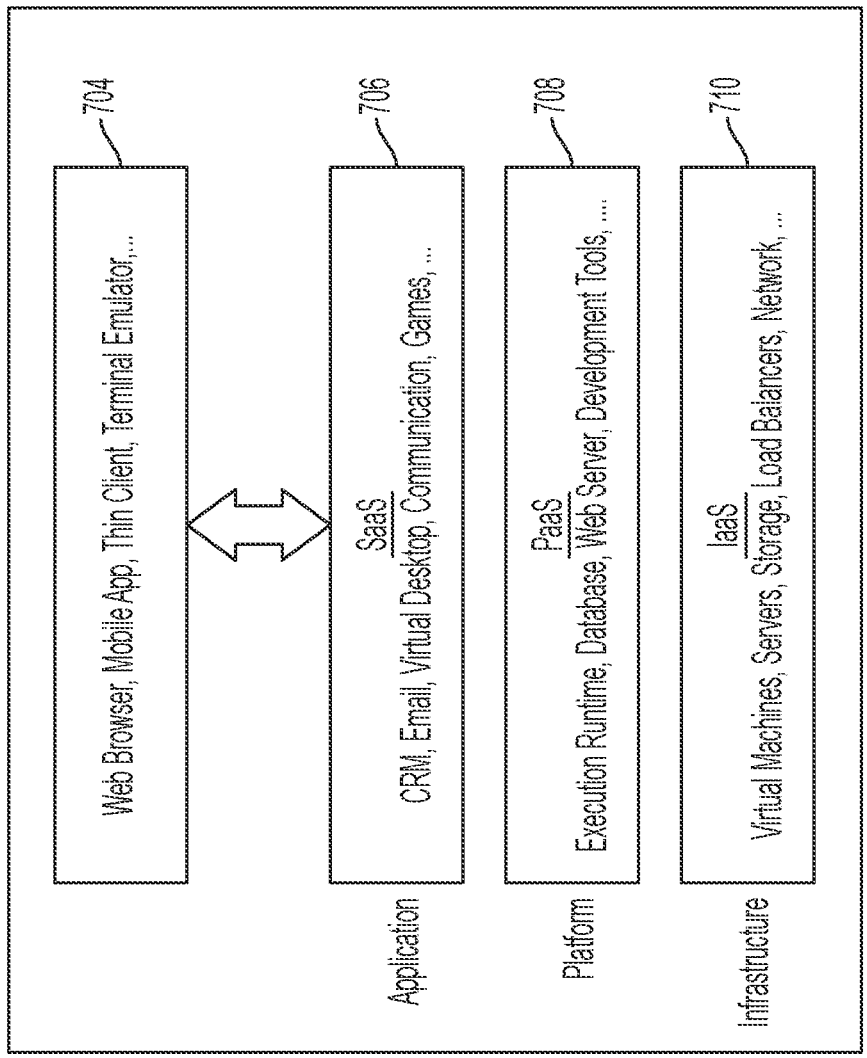
Figure 8:
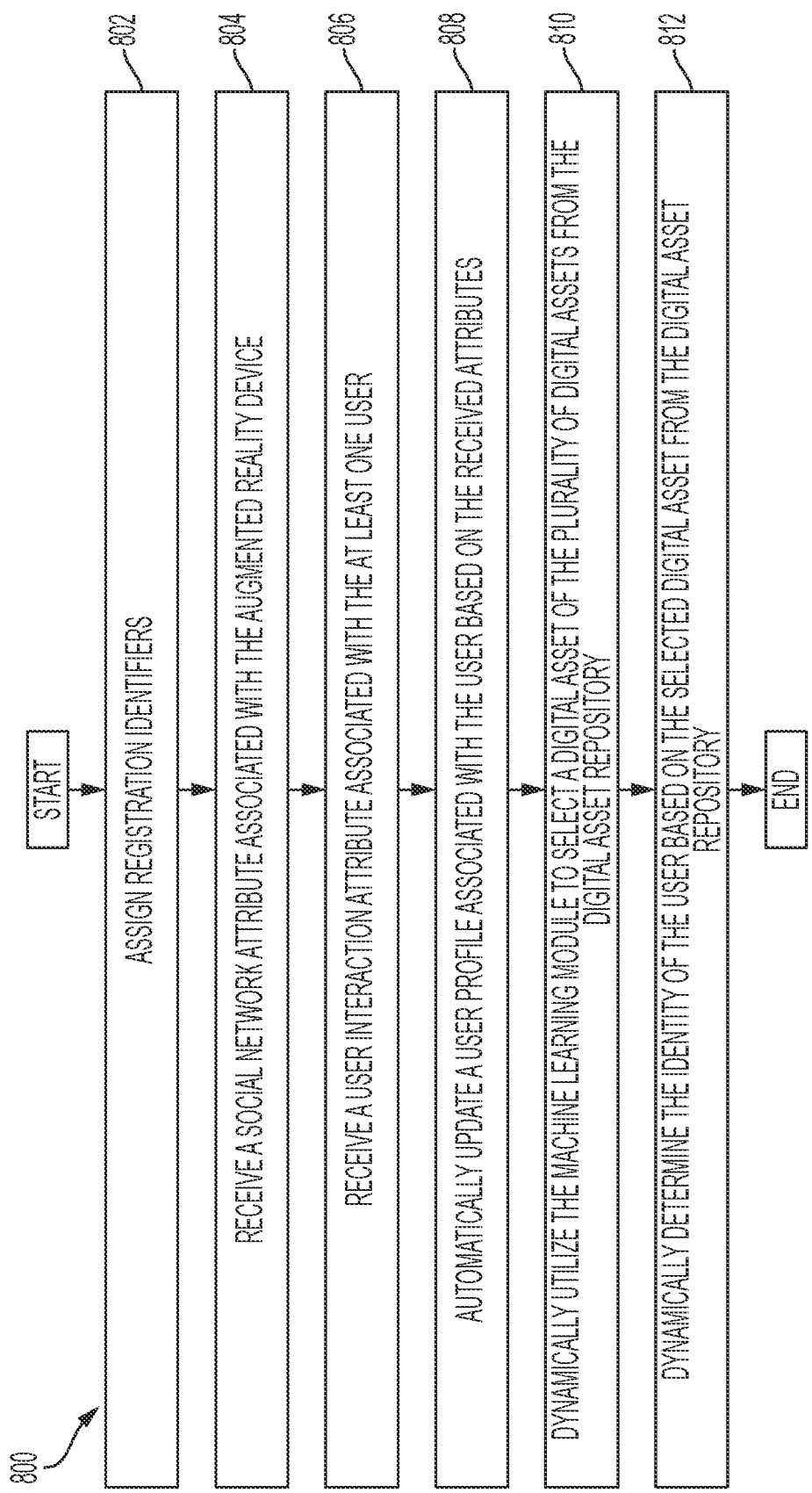
FIG. 8 is a flowchart illustrating operational steps for dynamically determining an identity of a user based on a selected digital asset for the digital asset repository, in accordance with one or more embodiments of the present disclosure.

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary spam prevention module 118 of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999, 999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary spam prevention module 118 of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A method may include: receiving, by one or more processors, a notification to engage at least one transmission guard bot of a plurality of transmission guard bots in a communication session between a plurality of computing devices associated with a plurality of users; generating, by the one or more processors and in response to the notification, at least one trained transmission guard bot configured with a plurality of communication capabilities to engage in the communication session between the plurality of computing devices associated with the plurality of users; engaging, by the one or more processors, the at least one trained transmission guard bot into the communication session between the plurality of computing devices associated with the plurality of users, where the at least one trained transmission guard bot is configured with an ability to perform at least one voice function during the communication session based on at least one communication capability of the plurality of communication capabilities; utilizing, by the one or more processors, the at least one trained transmission guard bot to continually monitor a plurality of content data points associated with the communication session for a predetermined period of time; detecting, by the one or more processors, at least one suspicious content data point within the plurality of content data points associated with the communication session based on the continual monitoring of the at least one transmission guard bot; determining, by the one or more processors and in response to detecting the at least one suspicious content data point, at least one risk assessment metric associated with the communication session based on the at least one suspicious content data point and the plurality of content data points associated with the communication session; and invoking, by the one or more processors, at least one action related to a spam prevention via the at least one trained transmission guard bot by: accessing a bot system that comprises a plurality of specialty bots, each specialty bot is provisioned to perform at least one bot-specific action; selecting at least one specialty bot from the plurality of specialty bots based at least in part on the at least one risk assessment metric; and invoking the at least one specialty bot to perform the at least one bot-specific action, wherein the at least one bot-specific action comprises at least one of: causing the communication session to terminate, causing another bot to join the communication session, tracing a phone number of the computing device from which a user initiates the communication session, transmitting a new communication to the computing device of the user, causing another computing device associated with an entity impersonated in the communication session to commence a cross reference search against a call log associated with the entity, reporting session-related information pertaining to the communication session to the entity, communicating contact information of the entity to the user at the computing device, and/or selecting and invoking an additional specialty bot to perform an additional action related to the spam prevention.

Clause 2. The method according to clause 1, where the communication session is a particular communication session initiated between a first computing device associated with a first user and a second computing device associated with a second user.

Clause 3. The method according to clause 1 or 2, where the at least one transmission guard bot is a multi-tiered bot configuration that is capable to simultaneously communicate with the plurality of computing devices.

Clause 4. The method according to clause 1, 2 or 3, further includes training, by the one or more processors, the at least one trained transmission guard bot i by: utilizing a plurality of voice characterizes associated with at least one user of the plurality of users over a predetermined period of time; and operating remotely from the plurality of computing devices for the predetermined period of time during the communication session.

Clause 5. The method according to clause 1, 2, 3 or 4, where the at least one trained transmission guard bot is configured with an ability to mute a speech of at least one user in the communication session.

Clause 6. The method according to clause 1, 2, 3, 4 or 5, where further including receiving a permission from at least one user of the plurality of users prior to the communication session to continually monitor for the plurality of content data points associated with the communication session.

Clause 7. The method according to clause 1, 2, 3, 4, 5 or 6, where the determining the at least one risk assessment metric associated with the communication session further includes dynamically calculating a risk metric value associated for each content data of a plurality of content data points based on a predetermined scale range by adding each content data point of the plurality of content data points, where the suspicious content data point is assessed a high risk, and where a minimum of the predetermined scale range corresponds to a low risk and a maximum of the predetermined scale range corresponds to the high risk.

Clause 8. The method according to clause 1, 2, 3, 4, 5, 6 or 7, further including enhancing, by the one or more processors, at least one computing device of the plurality of devices with an optimized spam prevention functionality by utilizing the at least one specialty bot to operate remotely on the at least one computing device.

Clause 9. A method may include: receiving, by one or more processors, a notification to engage at least one transmission guard bot of a plurality of transmission guard bots in a communication session between a plurality of computing devices associated with a plurality of users; generating, by the one or more processors and in response to the notification, at least one trained transmission guard bot configured with a plurality of communication capabilities to engage in the communication session between the plurality of computing devices associated with the plurality of users; engaging, by the one or more processors, the at least one trained transmission guard bot into the communication session between the plurality of computing devices associated with the plurality of users, where the at least one trained transmission guard bot is configured with an ability to perform at least one voice function during the communication session based on at least one communication capability of the plurality of communication capabilities; utilizing, by the one or more processors, the at least one trained transmission guard bot to continually monitor a plurality of content data points associated with the communication session for a predetermined period of time; detecting, by the one or more processors, at least one suspicious content data point within the plurality of content data points associated with the communication session based on the monitoring of the at least one transmission guard bot; determining, by the one or more processors and in response to detecting the at least one suspicious content data point, at least one risk assessment metric associated with the communication session based on the at least one suspicious content and the plurality of content data points associated with the communication session; invoking, by the one or more processors, at least one action related to a spam prevention via the at least one trained transmission guard bot by: accessing a bot system that comprises a plurality of specialty bots, each specialty bot is provisioned to perform at least one bot-specific action; selecting at least one specialty bot from the plurality of specialty bots based at least in part on the at least one risk assessment metric; and invoking the at least one specialty bot to perform the at least one bot-specific action, wherein the at least one bot-specific action comprises at least one of: causing the communication session to terminate, causing another bot to join the communication session, tracing a phone number of the computing device from which a user initiates the communication session, transmitting a new communication to the computing device of the user, causing another computing device associated with an entity impersonated in the communication session to commence a cross reference search against a call log associated with the entity, reporting session-related information pertaining to the communication session to the entity, communicating contact information of the entity to the user at the computing device, and/or selecting and invoking an additional specialty bot to perform an additional action related to the spam prevention; and dynamically enhancing, by the one or more processors, at least one computing device of the plurality of devices with an optimized spam prevention functionality by utilizing the at least one specialty bot to operate remotely on the at least one computing device.

Clause 10. The method according to clause 9, where the communication session is a particular interaction session between a first computing device associated with a first user and a second computing device associated with a second user.

Clause 11. The method according to clause 9 or 10, where wherein the at least one transmission guard bot is a multi-tiered bot configuration that is capable to simultaneously communicate with the plurality of computing devices.

Clause 12. The method according to clause 9, 10, or 11, further includes, by the one or more processors, training the at least one trained transmission guard bot by:

utilizing a plurality of voice characterizes associated with at least one user of the plurality of users over a predetermined period of time; and operating remotely from the plurality of computing devices for the predetermined period of time during the communication session.

Clause 13. The method according to clause 9, 10, 11, or 12, where the at least one trained transmission guard bot is configured with an ability to mute a speech of at least one user in the communication session.

Clause 14. The method according to clause 9, 10, 11, 12 or 13, further including receiving a permission from at least one user of the plurality of users prior to the communication session to continually monitor for the plurality of content data points associated with the communication session.

Clause 15. The method according to clause 9, 10, 11, 12, 13 or 14, where the determining the risk assessment metric associated with the communication session further includes dynamically calculating a risk metric value associated for each content data of a plurality of content data points based on a predetermined scale range by adding each content data point of the plurality of content data points, where the suspicious content data point is assessed a high risk, and where a minimum of the predetermined scale range corresponds to a low risk and a maximum of the predetermined scale range corresponds to the high risk.

Clause 16. A system may include: non-transient computer memory, storing software instructions; and at least one processor of a first computing device associated with a user; where, when the at least one processor executes the software instructions, the first computing device is programmed to: receive, by one or more processors, a notification to engage at least one transmission guard bot of a plurality of transmission guard bots in a communication session between a plurality of computing devices associated with a plurality of users; generate, by the one or more processors and in response to the notification, at least one trained transmission guard bot configured with a plurality of communication capabilities to engage in the communication session between the plurality of computing devices associated with the plurality of users; engage, by the one or more processors, the at least one trained transmission guard bot into the communication session between the plurality of computing devices associated with the plurality of users, wherein the at least one trained transmission guard bot is configured with an ability to perform at least one voice function during the communication session based on at least one communication capability of the plurality of communication capabilities; utilize, by the one or more processors, the at least one trained transmission guard bot to continually monitor a plurality of content data points associated with the communication session for a predetermined period of time; detect, by the one or more processors, at least one suspicious content data point within the plurality of content data points associated with the communication session based on the continual monitoring of the at least one transmission guard bot; determine, by the one or more processors and in response to detecting the at least one suspicious content data point, at least one risk assessment metric associated with the communication session based on the at least one suspicious content and the plurality of content data points associated with the communication session; and invoke, by the one or more processors, at least one action related to a spam prevention via the at least one trained transmission guard bot by: accessing a bot system that comprises a plurality of specialty bots, each specialty bot is provisioned to perform at least one bot-specific action; selecting at least one specialty bot from the plurality of specialty bots based at least in part on the at least one risk assessment metric; and invoking the at least one specialty bot to perform the at least one bot-specific action, wherein the at least one bot-specific action comprises at least one of: causing the communication session to terminate, causing another bot to join the communication session, tracing a phone number of the computing device from which a user initiates the communication session, transmitting a new communication to the computing device of the user, causing another computing device associated with an entity impersonated in the communication session to commence a cross reference search against a call log associated with the entity, reporting session-related information pertaining to the communication session to the entity, communicating contact information of the entity to the user at the computing device, or selecting and invoking an additional specialty bot to perform an additional action related to the spam prevention.

Clause 17. The system according to clause 16, where the communication session is a particular communication session initiated between a first computing device associated with a first user and a second computing device associated with a second user.

Clause 18. The system according to clause 16 or 17, where the at least one transmission guard bot is a multi-tiered bot configuration that is capable to simultaneously communicate with the plurality of computing devices.

Clause 19. The system according to clause 16, 17, or 18, further includes training, by the one or more processors, the at least one trained transmission guard bot by: utilizing a plurality of voice characterizes associated with at least one user of the plurality of users over a predetermined period of time; and operating remotely from the plurality of computing devices for the predetermined period of time during the communication session.

Clause 20. The system according to clause 16, 17, 18 or 19, where the at least one trained transmission guard bot is configured with an ability to mute at least one user when speaking in the communication session between the plurality of computing devices associated with the plurality of users.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:
receiving, by one or more processors, a notification to engage at least one transmission guard bot of a plurality of transmission guard bots in a communication session between a plurality of computing devices associated with a plurality of users;

generating, by the one or more processors and in response to the notification, at least one trained transmission guard bot configured with a plurality of communication capabilities to engage in the communication session between the plurality of computing devices associated with the plurality of users;

engaging, by the one or more processors, the at least one trained transmission guard bot into the communication session between the plurality of computing devices associated with the plurality of users, wherein the at least one trained transmission guard bot is configured with an ability to perform at least one voice function during the communication session based on at least one communication capability of the plurality of communication capabilities;

utilizing, by the one or more processors, the at least one trained transmission guard bot to continually monitor a plurality of content data points associated with the communication session for a predetermined period of time;

detecting, by the one or more processors, at least one suspicious content data point within the plurality of content data points associated with the communication session based on the continual monitoring of the at least one transmission guard bot;

determining, by the one or more processors and in response to detecting the at least one suspicious content data point, at least one risk assessment metric associated with the communication session based on the at least one suspicious content data point and the plurality of content data points associated with the communication session; and invoking, by the one or more processors, at least one action related to a spam prevention via the at least one trained transmission guard bot by:

accessing a bot system that comprises a plurality of specialty bots, each specialty bot is provisioned to perform at least one bot-specific action;

selecting at least one specialty bot from the plurality of specialty bots based at least in part on the at least one risk assessment metric; and invoking the at least one specialty bot to perform the at least one bot-specific action, wherein the at least one bot-specific action comprises at least one of:

causing the communication session to terminate, causing another bot to join the communication session, tracing a phone number of a computing device from which a user initiates the communication session, transmitting a new communication to the computing device of the user, causing another computing device associated with an entity impersonated in the communication session to commence a cross reference search against a call log associated with the entity, reporting session-related information pertaining to the communication session to the entity, communicating contact information of the entity to the user at the computing device, or selecting and invoking an additional specialty bot to perform an additional action related to the spam prevention.

2. The computer-implemented method of claim 1, wherein the communication session is a particular communication session that has been initiated between a first computing device associated with a first user and a second computing device associated with a second user.

3. The computer-implemented method of claim 1, wherein the at least one transmission guard bot is a multi-tiered bot configuration that is capable to simultaneously communicate with the plurality of computing devices.

4. The computer-implemented method of claim 1, further comprising:

training, by the one or more processors, the at least one trained transmission guard bot by:

utilizing a plurality of voice characterizes associated with at least one user of the plurality of users over a predetermined period of time; and operating remotely from the plurality of computing devices for the predetermined period of time during the communication session.

5. The computer-implemented method of claim 1, wherein the at least one trained transmission guard bot is configured with an ability to mute a speech of at least one user in the communication session.

6. The computer-implemented method of claim 1, further comprising:

receiving a permission from at least one user of the plurality of users prior to the communication session to continually monitor for the plurality of content data points associated with the communication session.

7. The computer-implemented method of claim 1, wherein the determining the at least one risk assessment metric associated with the communication session further comprises:

dynamically calculating a risk metric value associated for each content data of the plurality of content data points based on a predetermined scale range by adding each content data point of a plurality of content data points, wherein the suspicious content data point is assessed a high risk, and wherein a minimum scale of the predetermined scale range corresponds to a low risk and a maximum scale of the predetermined scale range corresponds to a high risk.

8. The computer-implemented method of claim 1, further comprising:

enhancing, by the one or more processors, at least one computing device of the plurality of devices with an optimized spam prevention functionality by utilizing the at least one specialty bot to operate remotely on the at least one computing device.

9. A computer-implemented method comprising:

receiving, by one or more processors, a notification to engage at least one transmission guard bot of a plurality of transmission guard bots in a communication session between a plurality of computing devices associated with a plurality of users;

generating, by the one or more processors and in response to the notification, at least one trained transmission guard bot configured with a plurality of communication capabilities to engage in the communication session between the plurality of computing devices associated with the plurality of users;

engaging, by the one or more processors, the at least one trained transmission guard bot into the communication session between the plurality of computing devices associated with the plurality of users, wherein the at least one trained transmission guard bot is configured with an ability to perform at least one voice function during the communication session based on at least one communication capability of the plurality of communication capabilities;
utilizing, by the one or more processors, the at least one trained transmission guard bot to continually monitor a plurality of content data points associated with the communication session for a predetermined period of time;
detecting, by the one or more processors, at least one suspicious content data point within the plurality of content data points associated with the communication session based on the monitoring of the at least one transmission guard bot;
determining, by the one or more processors and in response to detecting the at least one suspicious content data point, at least one risk assessment metric associated with the communication session based on the at least one suspicious content and the plurality of content data points associated with the communication session;
invoking, by the one or more processors, at least one action related to a spam prevention via the at least one trained transmission guard bot by:
accessing a bot system that comprises a plurality of specialty bots, each specialty bot is provisioned to perform at least one bot-specific action;
selecting at least one specialty bot from the plurality of specialty bots based at least in part on the at least one risk assessment metric; and
invoking the at least one specialty bot to perform the at least one bot-specific action, wherein the at least one bot-specific action comprises at least one of:
causing the communication session to terminate,
causing another bot to join the communication session,
tracing a phone number of a computing device from which a user initiates the communication session,
transmitting a new communication to the computing device of the user,
causing another computing device associated with an entity impersonated in the communication session to commence a cross reference search against a call log associated with the entity,
reporting session-related information pertaining to the communication session to the entity,
communicating contact information of the entity to the user at the computing device, or
selecting and invoking an additional specialty bot to perform an additional action related to the spam prevention; and
dynamically enhancing, by the one or more processors, at least one computing device of the plurality of devices with an optimized spam prevention functionality by utilizing the at least one specialty bot to operate remotely on the at least one computing device.

10. The computer-implemented method of claim 9, wherein the communication session is a particular communication session that has been initiated between a first computing device associated with a first user and a second computing device associated with a second user.

11. The computer-implemented method of claim 9, wherein the at least one transmission guard bot is a multi-tiered bot configuration that is capable to simultaneously communicate with the plurality of computing devices.

12. The computer-implemented method of claim 9, further comprising:
training, by the one or more processors, the at least one trained transmission guard bot by:
utilizing a plurality of voice characterizes associated with at least one user of the plurality of users over a predetermined period of time; and
operating remotely from the plurality of computing devices for the predetermined period of time during the communication session.

13. The computer-implemented method of claim 9, wherein the at least one trained transmission guard bot is configured with an ability to mute a speech of at least one user in the communication session.

14. The computer-implemented method of claim 9, further comprising receiving a permission from at least one user of the plurality of users prior to the communication session to continually monitor for the plurality of content data points associated with the communication session.

15. The computer-implemented method of claim 9, wherein the determining the risk assessment metric associated with the communication session further comprises:
dynamically calculating a risk metric value associated for each content data of the plurality of content data points based on a predetermined scale range by adding each content data point of a plurality of content data points, wherein the suspicious content data point is assessed a high risk, and
wherein a minimum of the predetermined scale range corresponds to a low risk and a maximum of the predetermined scale range corresponds to a high risk.

16. A system comprising:
a non-transient computer memory, storing software instructions; and
at least one processor of a first computing device associated with a user;
wherein, when the at least one processor executes the software instructions, the first computing device is programmed to:
receive, by one or more processors, a notification to engage at least one transmission guard bot of a plurality of transmission guard bots in a communication session between a plurality of computing devices associated with a plurality of users;
generate, by the one or more processors and in response to the notification, at least one trained transmission guard bot configured with a plurality of communication capabilities to engage in the communication session between the plurality of computing devices associated with the plurality of users;
engage, by the one or more processors, the at least one trained transmission guard bot into the communication session between the plurality of computing devices associated with the plurality of users, wherein the at least one trained transmission guard bot is configured with an ability to perform at least one voice function during the communication session based on at least one communication capability of the plurality of communication capabilities;
utilize, by the one or more processors, the at least one trained transmission guard bot to continually monitor a plurality of content data points associated with the communication session for a predetermined period of time;
detect, by the one or more processors, at least one suspicious content data point within the plurality of content data points associated with the communication session based on the continual monitoring of the at least one transmission guard bot;

determine, by the one or more processors and in response to detecting the at least one suspicious content data point, at least one risk assessment metric associated with the communication session based on the at least one suspicious content and the plurality of content data points associated with the communication session; and invoke, by the one or more processors, at least one action related to a spam prevention via the at least one trained transmission guard bot by:

accessing a bot system that comprises a plurality of specialty bots, each specialty bot is provisioned to perform at least one bot-specific action;

selecting at least one specialty bot from the plurality of specialty bots based at least in part on the at least one risk assessment metric; and invoking the at least one specialty bot to perform the at least one bot specific action, wherein the at least one bot-specific action comprises at least one of:

causing the communication session to terminate, causing another bot to join the communication session, tracing a phone number of a computing device from which a user initiates the communication session, transmitting a new communication to the computing device of the user, causing another computing device associated with an entity impersonated in the communication session to commence a cross reference search against a call log associated with the entity, reporting session-related information pertaining to the communication session to the entity, communicating contact information of the entity to the user at the computing device, or selecting and invoking an additional specialty bot to perform an additional action related to the spam prevention.

17. The system of claim 16, wherein the communication session is a particular interaction session between a first computing device associated with a first user and a second computing device associated with a second user.

18. The system of claim 16, wherein the at least one transmission guard bot is a multi-tiered bot configuration that is capable to simultaneously communicate with the plurality of computing devices.

19. The system of claim 16, further comprising:

training, by the one or more processors, the at least one trained transmission guard bot by:

utilizing a plurality of voice characterizes associated with at least one user of the plurality of users over a predetermined period of time; and operating remotely from the plurality of computing devices for the predetermined period of time during the communication session.

20. The system of claim 16, wherein the at least one trained transmission guard bot is configured with an ability to mute a speech of at least one user in the communication session.

* * * * *